United States Patent
Smolic et al.

(10) Patent No.: US 11,348,267 B2
(45) Date of Patent: May 31, 2022

(54) METHOD AND APPARATUS FOR GENERATING A THREE-DIMENSIONAL MODEL

(71) Applicant: The Provost, Fellows, Foundation Scholars, and the Other Members of Board, of the College of the Holy and Undivided Trinity of Queen Elizabeth, Near Dublin, Dublin (IE)

(72) Inventors: Aljosa Smolic, Dublin (IE); Rafael Pages, Dublin (IE); Jan Ondrej, Dublin (IE); Konstantinos Amplianitis, Dublin (IE); David Monaghan, Dublin (IE)

(73) Assignee: The Provost, Fellows, Foundation Scholars, and the Other Members of Board, of the College of the Holy and Undivided Trinity of Queen Elizabeth, Near Dublin Trinity Collge Dublin, Dublin (IE)

(*) Notice: Subject to any disclaimer, the term of this patent is extended or adjusted under 35 U.S.C. 154(b) by 0 days.

(21) Appl. No.: 16/955,564

(22) PCT Filed: Dec. 20, 2018

(86) PCT No.: PCT/EP2018/086331
§ 371 (c)(1),
(2) Date: Jun. 18, 2020

(87) PCT Pub. No.: WO2019/122205
PCT Pub. Date: Jun. 27, 2019

(65) Prior Publication Data
US 2020/0320727 A1    Oct. 8, 2020

(30) Foreign Application Priority Data
Dec. 22, 2017  (EP) .................................. 17210382

(51) Int. Cl.
*G06T 15/00* (2011.01)
*G06T 7/564* (2017.01)
(Continued)

(52) U.S. Cl.
CPC .............. *G06T 7/564* (2017.01); *G06T 15/08* (2013.01); *G06T 15/205* (2013.01); *G06T 17/10* (2013.01);
(Continued)

(58) Field of Classification Search
CPC ......... G06T 7/593; G06T 17/10; G06T 7/564; G06T 15/205; G06T 2207/20044; G06T 15/08; G06T 2207/30196
(Continued)

(56) References Cited

U.S. PATENT DOCUMENTS

| | | | |
|---|---|---|---|
| 7,583,272 B2 * | 9/2009 | Ramani | G06T 15/10 345/621 |
| 9,348,950 B2 * | 5/2016 | Hodgins | G06T 17/00 |
| 9,990,565 B2 * | 6/2018 | Rhoads | G06F 16/583 |

(Continued)

OTHER PUBLICATIONS

Mutlu B, Haciömeroğlu M, Serdar GM, Dikmen M, Sever H. Silhouette extraction from street view images. International Journal of Advanced Robotic Systems. Jul. 30, 2014;11(7):114.*
(Continued)

*Primary Examiner* — Phu K Nguyen
(74) *Attorney, Agent, or Firm* — Hoffman Warnick LLC

(57) ABSTRACT

The method comprising providing a plurality of images of a scene captured by a plurality of image capturing devices (101); providing silhouette information of at least one object in the scene (102); generating a point cloud for the scene in 3D space using the plurality of images (103); extracting an object point cloud from the generated point cloud, the object point cloud being a point cloud associated with the at least one object in the scene (104); estimating a 3D shape volume
(Continued)

of the at least one object from the silhouette information (105); and combining the object point cloud and the shape volume of the at least one object to generate a three-dimensional model (106). An apparatus for generating a 3D model, and a computer readable medium for generating the 3D model.

15 Claims, 6 Drawing Sheets

(51) Int. Cl.
    *G06T 15/08*     (2011.01)
    *G06T 15/20*     (2011.01)
    *G06T 17/10*     (2006.01)

(52) U.S. Cl.
    CPC ............... *G06T 2207/20044* (2013.01); *G06T 2207/30196* (2013.01)

(58) Field of Classification Search
    USPC ......................................................... 345/418
    See application file for complete search history.

(56) References Cited

U.S. PATENT DOCUMENTS

| | | | |
|---|---|---|---|
| 10,679,338 B2* | 6/2020 | Gros | G06T 7/001 |
| 10,867,436 B2* | 12/2020 | Oved | G06T 7/0012 |
| 10,893,251 B2* | 1/2021 | Koyama | G06T 7/55 |
| 10,991,160 B1* | 4/2021 | Arora | G06T 7/55 |
| 11,055,909 B2* | 7/2021 | Kobayashi | G06T 7/50 |

OTHER PUBLICATIONS

Arsalan Soltani A, Huang H, Wu J, Kulkarni TD, Tenenbaum JB. Synthesizing 3d shapes via modeling multi-view depth maps and silhouettes with deep generative networks. InProceedings of the IEEE conference on computer vision and pattern recognition 2017 (pp. 1511-1519).*

Schonberger, Johannes L. et al.; "Pixelwise View Selection for Unstructured Multi-View Stereo"; ECCV 2016; Part III LNCS 9907; pp. 501-518; Copyright: Springer International Publishing AG 2016.

Pages, R. et al.; "Seamless, Static Multi-Texturing of 3D Meshes"; Computer Graphics Forum; vol. 35; No. 1; 2015; pp. 228-238; Copyright: 2014 The Eurographics Assoication and John Wiley & Sons Ltd; Published by John Wiley & Sons Ltd.

Kutulakos, Kiriakos N. et al.; "A Theory of Shape by Space Carving"; International Journal of Computer Vision; 38 (3); pp. 199-218; 2000; Copyright: Kluwer Academic Publishers.

Pages, Rafael et al.; "Automatic system for virtual human reconstruction with 3D mesh multi-texturing and facial enhancement"; Signal Processing: Image Communication 28; 2013; pp. 1089-1099; Copyright: 2013 Published by Elsevier B.V.

Chrysostomou, Dimitrios et al.; "Lighting Compensating Multiview Stereo"; IEEE; Copyright 2011 IEEE.

Murasaki, Kazuhiko et al.; "Adaptive Human Shape Reconstruction via 3D Head Tracking for Motion Capture in Changing Environment"; 2011 IEEE/RS J International Conference on Intelligent Robots and Systems; Sep. 25-30, 2011; San Francisco, CA; pp. 3601-3607; Copyright 2011 IEEE.

Huang, Chun-Hao et al.; "Robust Human Body Shape and Pose Tracking"; 2013 International Conference on 3D Vision; IEEE Computer Society; pp. 287-294; Copyright 2013 IEEE.

O'Dwyer, Neill et al.; "Virtual Play in Free-viewpoint Video: Reinterpreting Samuel Beckett for Virtual Reality"; 2017 IEEE International Symposium on Mixed and Augmented Reality Adjunct Proceedings; IEEE computer society; pp. 262-267; Copyright 2017 IEEE.

International Search Report and Written Opinion for PCT/EP2018/086331 filed Dec. 20, 2018; pp. 13.

European Search Report for EP 17210382.2; pp. 11.

* cited by examiner

METHOD AND APPARATUS FOR GENERATING A THREE-DIMENSIONAL MODEL

The present invention relates to a method and apparatus for generating a three-dimensional model. In particular the present invention is concerned with generating a three-dimensional model of an object in a scene captured by a plurality of image capturing devices.

BACKGROUND

Emerging types of media support the ability to individually control the viewer's perspective, which can provide a more immersive and more personalized viewing experience. Furthermore, applications of virtual, augmented, and mixed reality (VR/AR/MR) are becoming widely available and used. There is an ever increasing demand for compelling content.

Most available VR/AR/MR content is synthetic (graphics), created by artists and designers. Available real-world content (live action) is mostly limited to 360-degree video captured using omnidirectional camera rigs. However, these rigs only provide a 3 degrees of freedom immersive experience, as only rotation is supported for the viewer.

To provide an immersive video viewing experience and/or VR/AR/MR content it is desirable to generate Free-Viewpoint Video (FVV). FVV allows a user to freely, or with some restrictions, navigate a recorded scene and select a certain viewpoint at any moment, within a given range. FVV therefore provides a 6 degrees of freedom immersive experience.

Current FVV techniques for generating FVV visual information from real-world content include image-based techniques, where the intermediate views between cameras are generated using interpolation or warping of the available images; and geometry-based techniques, where 3D geometry of both the dynamic foreground and static background is acquired, allowing the rendering from any other viewpoint.

An existing image-based FVV technique is to generate multiple depth maps using a multi-camera setup, allowing the user to experience new rendered views in between cameras and in a limited area around them.

Another image-based approach uses an array of standard consumer cameras to generate a FVV scene. The 2D matrix of cameras is extended to a 3D one by adding a temporal component, creating a 3D grid that is triangulated, and which defines different paths the virtual camera can take across the FVV sequence. The rendered view is a weighted warp of these possibilities. The resulting FVV is of high visual quality but if the number of cameras is limited, the possible navigation range is also very limited.

Another image based FFV technique is used in sports broadcasting. In this approach, a scene is captured using professional high-end cameras. Foreground masks and camera pose information are recovered at every frame, and a simple model of the background is reconstructed to improve the visual experience in camera transitions. This approach requires the transitions to be pre-computed offline, and does not allow freeze frames during the camera transitions (static FVV).

Geometry-based techniques focus on acquiring the 3D geometry of a scene. This can be seen as a 3D reconstruction problem that is extended to the temporal dimension.

Space carving, otherwise known as shape-from-silhouette (SfS) is an existing approach for generating the 3D geometry of objects in a scene. Multi-view stereo (MVS) techniques have also been used for the reconstruction of 3D models and especially for dynamic 3D scenes. Another existing approach uses, in a studio setup, both RGB cameras and infrared structured light to generate dense point clouds using MVS. These point clouds are meshed using a silhouette constrained Poisson surface reconstruction.

In between the image-based and geometry-based techniques for FVV content creation, there are existing hybrid techniques that make use of 3D geometry estimation to improve the synthesis of new views. One such existing approach uses MVS to generate a point cloud of the scene, helping their image warping system to perform better.

While FVV is an established technique, there are limited available options for generating real-world content using this approach. Many of these existing approaches as outlined above require complicated and expensive camera setups, cameras with IR sensing functionalities, and professional studios. These existing approaches also require significant computing resources, and may suffer from accuracy issues in certain situations.

It is an objective of the present invention to improve on, or at least provide an alternative to, existing methods and apparatuses for generating content based on captured images of a scene, and a particular objective is to improve on, or at least provide an alternative to existing methods and apparatuses that use geometry-based techniques to generate a 3D model of an object in the scene.

SUMMARY

According to the present invention there is provided a method and apparatus as set forth in the appended claims. Other features of the invention will be apparent from the dependent claims, and the description which follows.

According to a first aspect of the invention, there is provided a method for generating a three-dimensional model, the method comprising the following steps:
 (a) providing a plurality of images of a scene captured by a plurality of image capturing devices;
 (b) providing silhouette information of at least one object in the scene, the silhouette information being extracted from the plurality of images;
 (c) generating a point cloud for the scene in three-dimensional space using the plurality of images;
 (d) extracting an object point cloud from the generated point cloud, the object point cloud being a point cloud associated with the at least one object in the scene;
 (e) estimating a three-dimensional shape volume of the at least one object from the silhouette information; and
 (f) combining the object point cloud and the shape volume of the at least one object to generate the three-dimensional model.

The method according to the present invention is able to use a plurality of images of a scene captured by a plurality of image capturing devices to generate a three-dimensional model. In other words, the method is able to generate a three-dimensional model of an object in the scene, or all or part of the scene including the object using the captured image data. The object may be considered as the foreground of the scene.

The three-dimensional model may be for use in video content creation, and in particular Free-Viewpoint Video (FVV) content creation. The three-dimensional model may additionally or separately be used for the creation of Augmented Reality (AR) and/or Virtual Reality (VR) and/or other Mixed Reality (MR) content.

The method obtains an object point cloud associated with at least one object in the scene, and a three-dimensional shape volume of the at least one object. The object point cloud and the three-dimensional shape volume are obtained from the captured images. Significantly, the object point cloud and the shape volume are combined to generate the three-dimensional model.

The combination of the object point cloud and the shape volume is beneficial. This is particularly the case where the plurality of image capturing devices are arranged in a sparse setup. A sparse setup may mean that only a small number of image capturing devices are provided to capture the scene.

The small number of image capturing devices may be closely arranged together, meaning that there is overlapping image data for a small section of the scene but patchy data for the rest of the scene. In such a sparse setup, if the silhouette information were used, by itself, to generate the three-dimensional model then the three-dimensional model would not be able to accurately recreate the object in the scene. There would likely be significant occlusions, which would likely result in significantly inflated volumes for the three-dimensional model meaning that the three-dimensional model does not accurately reflect the object in the scene.

The small number of image capturing devices may be spread out, meaning that while the overall scene is captured, there is little overlapping image data. In such a sparse setup, an object point cloud technique will likely be unable to compute a dense point cloud covering the object's surface sufficiently. This means that an object point cloud technique by itself will be unlikely able to generate a three-dimensional model.

Significantly, by combing the object point cloud and the shape volume, the method of the present invention is able generate three-dimensional models that accurately reflect the object in the scene even in sparse image capturing device setups. The method of the present invention therefore enables the benefits of the object point cloud and the shape volume techniques to be achieved without the associated disadvantages. The generated three-dimensional model is able to preserve the detail of the object point cloud and the completeness of the estimated three-dimensional shape volume while avoiding inflation of the three-dimensional model.

The method is able to generate accurate three-dimensional models of the object using low cost image capturing devices. This includes RBG cameras without using IR sensing functionality, and especially handheld cameras such as mobile phones. The method is also able to be used with informal networks of cameras, such as multiple people catching a scene on their mobile phones.

The generated three-dimensional model may be static. In preferred applications, such as free-viewpoint video, the generated three-dimensional model is preferably dynamic.

The image capturing devices may each capture video data comprising a plurality of temporally separated images, here each image as captured by an image capturing device represents a frame of the video. The method may comprise generating three-dimensional models of the object for the different frames of video, such that a dynamic three-dimensional model of the object is generated.

Step (e) of estimating the three-dimensional shape volume may further comprise:
  performing a voxel colour consistency check on the shape volume estimated from the silhouette information so as to determine one or more voxels of the shape volume that are not colour consistent.

Estimating the three-dimensional shape volume from the silhouette information itself may result in an occluded three-dimensional shape which does not accurately represent the object. This is because the use of the silhouette information, by itself, may not be able to handle concavities in the object, and such effects may be magnified in sparse image capturing device setups.

Significantly, performing a voxel colour consistency check on the shape volume may be used to determine voxels of the shape volume that are not colour consistent. Any voxels determined to not be colour consistent may be voxels representing image data that does not belong to the object. These colour inconsistent voxels may be removed from the shape volume. This has the benefit of removing voxels that do not represent the object, and means that the resultant three-dimensional model may be a more accurate reflection of the object in the scene.

This approach to carving out the shape volume using the voxel colour consistency check is ideally suited for smoothing sharp edges that might appear in sparse image capturing device setups. The voxel colour consistency check also enables the method to be more robust to noisy object/foreground masks that might include part of the background in the shape volume.

Step (e) may further comprise removing voxels from the shape volume that are determined not to be colour consistent.

Performing the voxel colour consistency check on the shape volume may comprise:
  projecting voxels of the shape volume estimated from the silhouette information onto the plurality of images to generate a plurality of projections for each voxel projected onto the plurality of images; and optionally
  calculating a difference in colour across the plurality of projections for each voxel projected onto the plurality of images; and optionally
  determining, from the calculated colour differences, one or more voxels of the shape volume that are not colour consistent.

Calculating the colour difference may comprise calculating the colour variance across the plurality of projections.

The shape volume comprises a set of voxels. The present method may project some or all of these voxels onto the plurality of images. If the voxel is part of the object, then the resultant projections should be colour consistent across the plurality of images because they all represent the same point of the object across the plurality of images. If, however, the voxel is not part of the object, then the resultant projections will be expected to be colour inconsistent because they may represent different parts of the scene across the plurality of images.

The calculated colour variance may be the variance in the colour hue across the plurality of projections for each voxel projected onto the plurality of images.

In existing image-based photo hulls approaches, RGB colour channels or the CIELAB colour space have been used to determine whether a voxel is colour consistent. By contrast, the method of the present invention may use the variance in the colour hue, e.g. the variance measured on the hue channel of the HSV colour space. The use of the colour hue is beneficial as it enables the present method to accept less relevant differences in saturation and value that may remain in images, e.g. after colour correction. Such differences may normally be due to differences in the sensor or white balance of the plurality of image capturing devices. The method of the present invention is therefore able to use the difference in colour hue value which is actually the differentiating quantity rather than other, less relevant, colour measures.

Step (e) of estimating the three-dimensional shape volume may further comprise:

providing an estimated three-dimensional skeleton of the at least one object, the three-dimensional skeleton being estimated from the plurality of images; and optionally calculating, for voxels of the shape volume, the distance between the voxel and a portion of the three-dimensional skeleton; and optionally removing voxels from the shape volume based on the calculated distance.

The portion of the three-dimensional skeleton may be the portion of the three-dimensional skeleton nearest to the voxel.

Here, a "three-dimensional skeleton" can be considered as a thin version of the overall shape volume of the object that may only contain necessary structural features. The three-dimensional skeleton may a thin version of the overall shape volume that is equidistant or approximately equidistant to the boundaries of the shape volume. The skeleton may emphasize the geometrical and topological properties of the shape volume, such as its connectivity, topology, and dimensions.

The method may thus determine voxels of the shape volume that are far away from an estimated three-dimensional skeleton of the object. Such voxels may unlikely be part of the object, and thus may be removed resulting in a shape volume that better reflects the object in the scene. This approach to carving out the shape volume using the three-dimensional skeleton is ideally suited to the presence of large occlusions, which the colour consistency check may not accurately detect.

Providing the three-dimensional skeleton of the at least one object may comprise: detecting two-dimensional skeletons of the at least one object in the plurality of images; and may further comprise generating the three-dimensional skeleton from the detected two-dimensional skeletons.

Here, a "two-dimensional skeleton" can be considered as a thin version of the overall object in the image data that may only contain necessary structural features. The two-dimensional skeleton may a thin version of the object in the image data that is equidistant or approximately equidistant to the boundaries of the object in the image data.

The three-dimensional skeleton may thus be estimated using two-dimensional skeletons estimated from the input images. This may involve triangulating the two-dimensional skeletons estimated from the input images.

The method may carve out the shape volume using the voxel colour consistency check and the three-dimensional skeleton or may use only one of these shape carving techniques. The method may first perform the voxel colour consistency check for the voxels, and may then perform the three-dimensional skeleton check for the voxels, or vice versa.

In an example implementation, the voxel colour consistency check may be performed on a voxel and the voxel may be given a score. A low score may indicate that the voxel is a candidate for removal. A three-dimensional skeleton check, e.g. by calculating for the voxel the distance between the voxel and the portion of the three-dimensional skeleton that is nearest to the voxel, may then be performed and the voxel may be given a score based on this check.

The voxel may be removed based on the voxel colour consistency check score or the three-dimensional skeleton check score. In addition, the voxel may be removed based on a combination of both these scores. That is, if both the voxel colour consistency check score and the three-dimensional skeleton check score are low, the voxel is likely to be removed.

The voxel colour consistency check and/or the three-dimensional skeleton check may be performed for the voxels on the surface of the shape volume. It will be appreciated that as voxels are removed, new voxels are exposed and form part of the surface of the shape volume. The voxel colour consistency check and/or the three-dimensional skeleton check may be repeated until a convergence condition is reached, e.g. no more voxels satisfy a condition for removal.

Step (f) of combining the object point cloud and the shape volume of the at least one object to generate the 3D model may comprise:

estimating the surface of the shape volume; and optionally estimating the surface of the object point cloud; and optionally using the surface of the shape volume and the surface of the object point cloud to generate the 3D model.

Using the surface of the shape volume and the surface of the object point cloud may comprise deforming the surface of the shape volume using the surface of the object point cloud. Here, "deforming" means altering the surface of the shape volume, e.g. by shrinking or expanding the surface. In this way, if the estimated shape volume is inflated, it may be deformed down in size using the object point cloud. In addition, the surface of the object point cloud may be used to add detail to the surface of the shape volume. Further, if the estimated shape volume misses a part of the object, the object point cloud may be used to add the missing part into the three-dimensional model.

Step (a) of providing the plurality of images may further comprise correcting the colour of the plurality of images. This may comprise applying a colour transformation function to the plurality of images.

The plurality of image capturing devices may have different camera sensors with different resolutions and even different white balances. This may be because the plurality of image capturing devices are part of an informal, rather than a professional setup for capturing the scene. The plurality of image capturing devices may be for example mobile phones.

This may mean that the resultant images have differences in colour tone and these differences in colour tone may be caused by variation in the image capturing devices rather than variation in colour tone in the scene being captured. This variation in colour tone may introduce errors in the voxel colour consistency check or artifacts in a resultant stage of generating appearance information for the three-dimensional model.

Significantly, by correcting the colour of the plurality of images the present invention is able to mitigate or reduce the effect of these differences in colour tone.

Step (a) of providing the plurality of images may further comprises estimating the pose of the plurality of image capturing devices in the three-dimensional coordinate system of the scene when capturing the plurality of images. The pose may be estimated using Structure from Motion (SfM) techniques.

The plurality of image capturing devices may have different poses. These different poses may vary and be unpredictable. This may especially be the case if the plurality of image capturing devices are handheld cameras, such as mobile phones. By estimating the pose of the image capturing devices, the method of the present invention is able to take this variation in pose into account when generating the three-dimensional model.

Step (b) of providing the silhouette information of the at least one object in the scene may comprise segmenting the plurality of images so as to determine the silhouette information.

The method may further comprise rendering the 3D model to generate visual information.

The method may further comprise:
(g) generating appearance information for the three-dimensional model; and
(h) generating visual information for the scene using the appearance information.

Here, "visual information" may be used to generate a three-dimensional reconstruction of the scene which may be viewed by a user. The visual information may be used to generate video data, such as dynamic image data. The video data may be for free-viewpoint video, meaning that different image or video scenes may be constructed by moving the viewpoint within the video data space. The visual information may be 3D model data providing the visual appearance of a 3D model. The visual information may be used for free-viewpoint video. The visual information may refer to augmented reality, virtual reality, or other mixed reality image data.

Here, "appearance information" may mean information regarding the appearance of the at least one object. The appearance information may be derived from the plurality of images.

Step (g) of generating the appearance information may comprise using image-based rendering methods to texture the three-dimensional model using the plurality of images.

The method may further comprise:
extracting a background point cloud from the generated point cloud, the background point cloud being the point cloud remaining after the object point cloud has been extracted;
and optionally generating a background three-dimensional model from the background point cloud.

The background three-dimensional model may be a static three-dimensional model.

The method may further comprise generating background appearance information using the background three-dimensional model. Generating the visual information for the scene may comprise generating the visual information using the appearance information and the background appearance information.

Accordingly, there is provided a computer readable medium having instructions recorded thereon which, when expected by a processing device, cause the processing device to perform the method of the first aspect of the invention.

Accordingly, there is provided an apparatus for generating a three-dimensional model, the apparatus comprising:
an image providing module for providing a plurality of images of a scene captured by a plurality of image capturing devices;
a silhouette information providing module for providing silhouette information of at least one object in the scene, the silhouette information being extracted from the plurality of images;
a point cloud generation module for generating a point cloud for the scene in three-dimensional space using the plurality of images;
an object point cloud extraction module for extracting an object point cloud from the generated point cloud, the object point cloud being a point cloud associated with the at least one object in the scene;
a three-dimensional shape volume estimation module for estimating a three-dimensional shape volume of the at least one object from the silhouette information; and
a combining module for combining the object point cloud and the shape volume of the at least one object to generate a three-dimensional model.

The apparatus may further comprise:
an appearance information generation module for generating appearance information for the at least one object using the three-dimensional model; and
a video generation module for generating the visual information for the scene using the appearance information.

The apparatus may be operable to perform the method of the first aspect of the invention.

According to a second aspect of the invention, there is provided a method for generating a three-dimensional model, the method comprising:
(a) providing silhouette information of at least one object in the scene, the silhouette information being extracted from a plurality of images captured by a plurality of imaging devices;
(b) providing a three-dimensional skeleton of the at least one object;
(c) estimating a three-dimensional shape volume of the at least one object from the silhouette information;
(d) calculating, for voxels of the shape volume, the distance between the voxel and a portion of the three-dimensional skeleton;
(e) removing one or more voxels from the shape volume based on the calculated distance to generate a modified shape volume; and
(f) generating the three-dimensional model using the modified shape volume.

While the use of an object point cloud and shape volume and combining these to generate the 3D model achieves numerous benefits as outlined above, this approach is not necessary in all aspects of the invention. In particular, the additional step of performing the three-dimensional skeleton check to remove voxels from the shape volume improves, by itself, on existing SfS approaches by providing improved shape carving of the shape volume. This means that a shape volume estimated using the features of the second aspect of the invention improves on the existing SfS approach and results in the more accurate generation of the three-dimensional model even in sparse camera setups.

Accordingly, there is provided a computer readable medium having instructions recorded thereon which, when expected by a processing device, cause the processing device to perform the method of the second aspect of the invention.

Accordingly, there is provided an apparatus for generating a three-dimensional model, the apparatus comprising:
a silhouette information providing module for providing silhouette information of at least one object in the scene, the silhouette information being extracted from the plurality of images;
a three-dimensional skeleton providing module for providing a three-dimensional skeleton of the at least one object;
a three-dimensional shape volume estimation module for estimating a three-dimensional shape volume of the at least one object from the silhouette information;

a voxel calculation model for calculating, for voxels of the shape volume, the distance between the voxel and a portion of the three-dimensional skeleton; and a removing voxel module for removing one or more voxels from the shape volume based on the calculated distance to generate a modified shape volume; and a three-dimensional model generation module for generating the three-dimensional model using the modified shape volume.

According to a third aspect of the invention, there is provided a method for generating a three-dimensional model, the method comprising:

(a) providing silhouette information of at least one object in the scene, the silhouette information being extracted from a plurality of images captured by a plurality of imaging devices;

(b) estimating a three-dimensional shape volume of the at least one object from the silhouette information;

(c) performing a voxel colour consistency check on the shape volume estimated from the silhouette information, the voxel colour consistency check comprising:

projecting voxels of the shape volume onto the plurality of images to generate a plurality of projections for each voxel projected onto the plurality of images;

calculating the colour variance across the plurality of projections for each voxel projected onto the plurality of images, wherein the calculated colour variance is the variance in the colour hue across the plurality of projections for each voxel projected onto the plurality of images;

determining, from the calculated colour variances, voxels of the shape volume that are not colour consistent; and (d) removing one or more voxels from the shape volume that are determined not to be colour consistent so as to generate a modified three-dimensional shape volume; and (e) generating the three-dimensional model using the modified three-dimensional shape volume.

While the use of an object point cloud and shape volume, and combining these to generate the 3D model achieves numerous benefits as outlined above, this approach is not necessary in all aspects of the invention. In particular, the additional step of performing the colour consistency check using the colour hue information to remove voxels from the shape volume improves, by itself, on existing SfS approaches by providing improved shape carving of the shape volume. This means that a shape volume estimated using the features of the third aspect of the invention improves on the existing SfS approach and results in the more accurate generation of the three-dimensional model even in sparse camera setups.

Accordingly, there is provided a computer readable medium having instructions recorded thereon which, when expected by a processing device, cause the processing device to perform the method of the third aspect of the invention.

Accordingly, there is provided an apparatus for generating a three-dimensional model, the apparatus comprising:

a silhouette information providing module for providing silhouette information of at least one object in the scene, the silhouette information being extracted from a plurality of images captured by a plurality of imaging devices;

a three-dimensional shape volume estimation module for estimating a three-dimensional shape volume of the at least one object from the silhouette information;

a voxel colour consistency check performing module for performing a voxel colour consistency check on the shape volume estimated from the silhouette information, the voxel colour consistency check comprising:

projecting voxels of the shape volume onto the plurality of images to generate a plurality of projections for each voxel projected onto the plurality of images;

calculating the colour variance across the plurality of projections for each voxel projected onto the plurality of images, wherein the calculated colour variance is the variance in the colour hue across the plurality of projections for each voxel projected onto the plurality of images;

determining, from the calculated colour variances, voxels of the shape volume that are not colour consistent; and a voxel removing module for removing one or more voxels from the shape volume that are determined not to be colour consistent so as to generate a modified three-dimensional shape volume; and a three-dimensional model generation module for generating the three-dimensional model using the modified three-dimensional shape volume.

BRIEF DESCRIPTION OF THE DRAWINGS

Examples of the present disclosure will now be described with reference to the accompanying drawings, in which.

DETAILED DESCRIPTION

Figure 1:
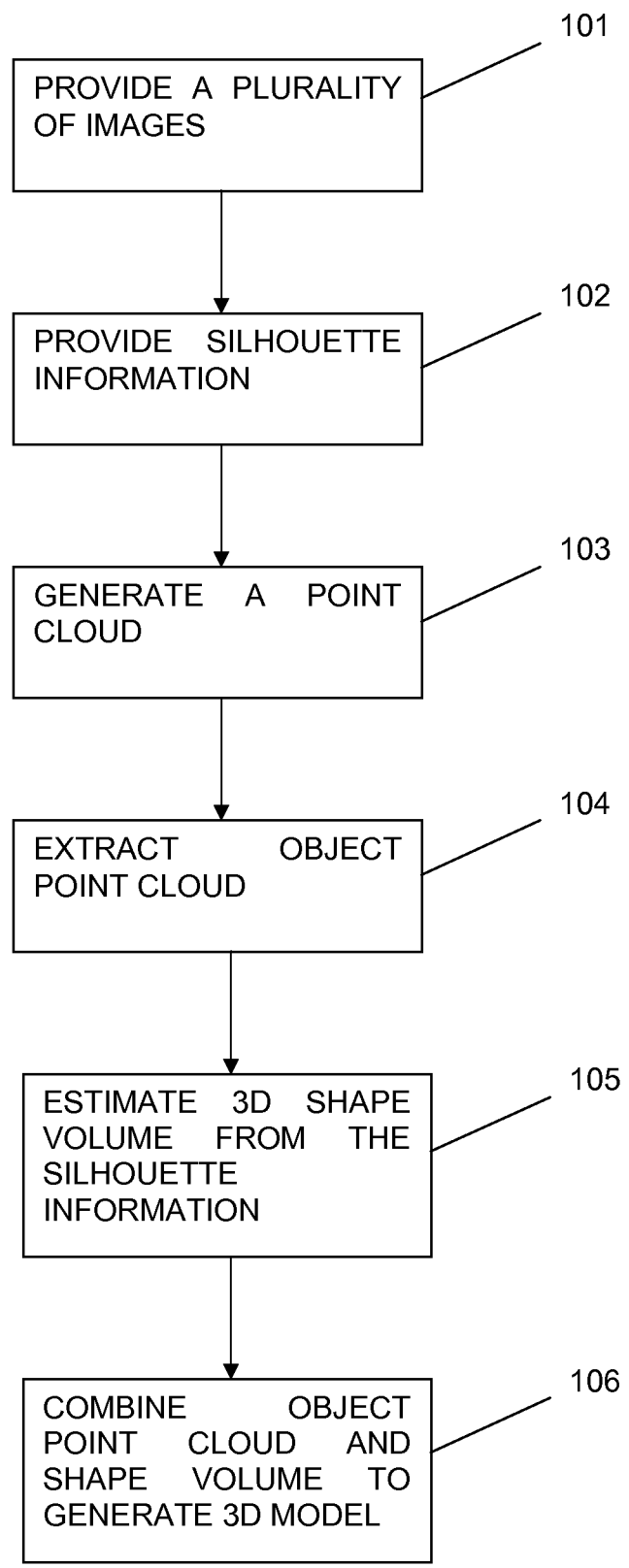
FIG. 1 shows a method according to a first aspect of the invention.

Referring to FIG. 1 there is shown an example method for generating a three-dimensional (3D) model according to the first aspect of the invention.

In step 101 a plurality of images are provided. The plurality of images are of a scene captured by a plurality of image capturing devices. The scene in this context can be understood as a 3D region with an object, such as a person, located therein. The object may be dynamic, meaning that it is moving between frames of images captured by the plurality of image capturing devices, and the background of the scene may be relatively stationary.

The image capturing devices may be any device capable of capturing static images or dynamic images, e.g. video. The image capturing devices could, for example, be professional video cameras as used in the television and film industries. Such image capturing devices may be dispersed around the scene in a dense, regular, arrangement such that a large amount of information for the scene is captured in the images, and that there is a large amount of overlap between the images captured by the different image capturing devices. The image capturing devices may be simple handheld cameras, video recorders, or even mobile phones with the capability to capture images and/or record videos. The image capturing devices may be sparsely arranged around the scene such that some aspects of the scene may not be captured in detail, and/or such that there may not be much overlap between the images captured by the image capturing devices. It will be appreciated that not all of the image capturing devices need be the same, and that they could comprise a number of different types of image capturing devices.

In some examples, in step 101, one or more pre-processing operations are performed on the plurality of images. Such pre-processing operations are particularly useful where the plurality of image capturing devices are of low quality, of different types, and/or handheld.

One example pre-processing operation is to colour correct the images captured by the plurality of image capturing devices. The plurality of image capturing devices may have different camera sensors with different resolutions and even different white balances, which may affect the quality and/or accuracy of the generated 3D model unless corrected for.

An example colour correction operation requires the designation of a palette image and a target image, and involves determining a colour transformation function to transform the colour distribution of the target image to match that of the palette image. In this example, the palette image is an image captured by one of the image capturing devices while a target image is an image captured by a different one of the image capturing devices. A target images is selected for each of the image capturing devices such that colour transformation functions are determined for each of the image capturing devices.

In this example colour correction operation, Gaussian Mixture Models are used to represent the colour distribution of the target and palette image. The target and palette images are robustly registered to estimate a non-linear parametric colour transformation function. This colour transformation function is then applied for all of the images captured by the respective image capturing devices. Because the transformation function is parametric, it can be applied to all of the images captured by the respective image capturing device without creating temporal artifacts. Further, this approach is ideally suited to parallel processing architectures so as to enable the colour correction of the images to be completed within minimal processing time.

It will be appreciated that other techniques for correcting for colour across the images captured by the plurality of image capturing devices are within the scope of the present invention. It will further be appreciated that the colour correction operation is not required for the method of the first aspect of the invention. This is especially the case where all of the image capturing devices are of the same type/model or have the same image sensor.

Another example pre-processing operation is to estimate the pose of the image capturing devices. The plurality of image capturing devices may have different poses, and these poses may vary in an unpredictable manner. This is especially the case if the plurality of image capturing devices are handheld cameras, such as mobile phones.

An example pose estimation operation involves estimating the pose of the plurality of image capturing devices in 3D space, and in particular in the three-dimensional coordinate system of the scene when capturing the plurality of images.

One approach for estimating the pose of the image capturing devices is to use Structure from Motion (SfM) techniques on a frame-by-frame basis. But such an approach could be intractable and computationally expensive.

Another approach for estimating the pose of the image capturing devices is to use monocular Simultaneous Localization and Mapping (SLAM) algorithms. But such approaches may not be successfully due to their dependency on good initialisation and instability for very small motions, which is typically the case with handheld devices.

A beneficial approach is to estimate accurate calibration using SfM at only at a subset of the time intervals. These small subset of frames are denoted as keyframes, and in one example implementation, there is one keyframe for every second of video. In between these time intervals, an algorithm is applied to interpolate calibration parameters for each image capturing device individually.

In more detail, for this beneficial approach, we can represent the n image capturing devices video sequences as $S=(s_1, \ldots, s_n)$, where $s_i(j)$, $j \in (1, \ldots, N)$ denotes the jth frame of a video sequence $s_i \in S$, with N number of frames. Here, a frame of a video sequence can be considered as an image provided by the image capturing device.

A feature in an image $s_j(j)$ is defined as:

$$f_j(k)=\{x_j(k), d_j(k)\}, x_j(k) \in \mathbb{R}^2, d_j(k) \in \mathbb{R}^d \qquad (1)$$

Here, $x_j(k)$ corresponds to a 2D position of a feature k in frame $s_i(j)$ and $d_j(k)$ represents the description of feature $f_j(k)$ in space d. Because, in this example approach, Scale Invariant Feature Transform (SIFT) features are used, the space size of the descriptor is set to d=128.

As mentioned above, the 3D poses of the image capturing devices are estimated by applying SfM on a small subset of frames (key frames) n for every video sequence. The key frame poses are then used as a reference for performing an interpolation process for each image capturing device.

The key frames have accurate 2D↔3D correspondences which are computed during the triangulation and bundle adjustment process of the SfM pipeline. This correspondence is exploited during the interpolation stage.

In particular, if $s'(j)$ and $s_i(j+1)$ represent a keyframe and the following frame in the video sequence $s_i \in S$, the first step towards finding the camera pose of $s_i(j+1)$ is to compute successive 2D matches between the two frames. The successive 2D matches may be computed using a Nearest Neighbour Search (NNS) matching approach.

In the second step, when all successful matches have been found for frame $s_i(j+1)$, every feature $f_{j+1}(k)$ will have a valid match $f_j'(k)$ in frame $s_i'(j)$, which is known to correspond to a 3D point in the reconstruction. The updated correspondences are then used as an input to a PnP algorithm for computing the image capturing device pose for the new frame. Different PnP algorithms may be used depending on the 3D geometry of the scene.

It has been found that the distribution of the 2D↔3D correspondence may affect the accuracy of the estimated pose. In particular, it has been found that the position of the image capturing device is more sensitive with respect to rotation movements. This effect may be compensated for by running a two way pass for every frame in the video sequence and computing the final position by a linear interpolation between the two values.

It will be appreciated that other techniques for estimating the pose of the plurality of image capturing devices are within the scope of the present invention. It will further be appreciated that the pose estimation operation is not required for the method of the first aspect of the invention. This is especially the case where the image capturing devices are not handheld devices.

Another example pre-processing operation is to segment the at least one object in the plurality of images. There are many segmentation approaches available, and the choice of segmentation approach may depend on factors such as the quality of the image data, the type of object to be segmented, and the computational resources available. The present invention is not limited to any particular image segmentation technique. It will further be appreciated that the operation of segmentation may not be required if the image data is provided pre-segmented, for example.

Referring to FIG. 1, in step 102, silhouette information is provided of at least one object in the scene. The silhouette information is extracted from the plurality of images, and may be obtained by performing segmentation operations on the plurality of images as described above.

In step 103, a point cloud for the scene in 3D space is generated using the plurality of images.

In one example approach, the generation of the point cloud follows a two-stage approach.

In a first stage, a sparse point cloud is calculated through an SfM approach, typically using SIFT features. In a second stage, a patch-based point cloud densification algorithm, such as PMVS, generates the final dense cloud. The density of the resulting 3D point cloud depends on the number of cameras and the amount of overlap in the images.

In a preferred approach, KAZE features are used to generate the sparse 3D point cloud as the computation can be easily parallelised. Further, the resulting sparse point clouds are slightly denser compared to the SIFT approach. The KAZE approach may not accurately detect feature points in dark areas so it is further preferred to enhance the images prior to using the KAZE features.

Referring to FIG. 1, in step 104, the object point cloud is then extracted from the generated 3D point cloud. The object point cloud may be extracted using the silhouette information, otherwise known as object masks, obtained from a segmentation operation performed on the images. This results in segmenting the generated 3D point cloud into the object point cloud, i.e. the foreground point cloud, and a background point cloud.

Figure 2:
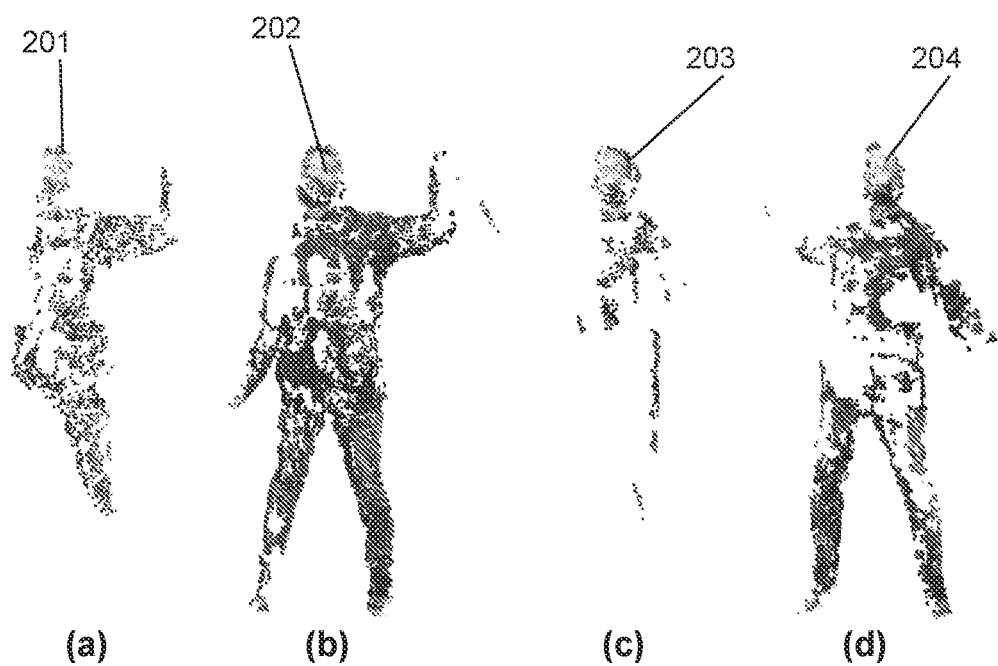
FIGS. 2(a)-(d) show example point clouds generated for an object.

Referring to FIGS. 2(a)-(d) there is shown resultant object point clouds 201-204 generated for a first frame (FIGS. 2(a)-(b)) and a second frame (FIGS. 2(c)-2(d)) of a video sequence captured by a plurality of image capturing devices in a sparse setup. The object point clouds 201, 203 in FIGS. 2(a) and 2(c) show the SIFT+PMVS approach, while the object point clouds 202, 204 in FIGS. 2(b) and 2(d) show the preferred KAZE approach with colour enhancement. FIGS. 2(a)-2(d) highlight that the KAZE approach generates denser point clouds 202, 204, and thus enables a more accurate 3D model to be generated.

Referring to FIG. 1, in step 105 a three-dimensional shape volume of the at least one object is estimated using the silhouette information.

The three-dimensional shape volume is estimated using a shape-from-silhouette (SfS) approach. Existing SfS approaches may not be able to handle concavities well, and may suffer from occlusions when sparse setups of image capturing devices are used.

Significantly, the present invention is able to mitigate this effect by using shape carving techniques for carving out the shape volume to remove voxels which have been incorrectly determined to be part of the shape volume using the SfS approach.

In an example implementation, the present invention performs a voxel colour consistency check on the shape volume estimated from the silhouette information so as to determine voxels of the shape volume that are not colour consistent.

In this example implementation, voxels of the shape volume are projected onto the plurality of images. This results in the generation of a plurality of projections for each voxel projected onto the plurality of images. If the voxel is part of the object, then the resultant projections should be colour consistent across the plurality of images because they all represent the same point of the object across the plurality of images. If, however, the voxel is not part of the object, then the resultant projections will be expected to be colour inconsistent because they may represent different parts of the scene across the plurality of images.

To determine this, the present method calculates a difference in colour across the plurality of projections for each voxel projected onto the plurality of images; and determines, from the calculated colour differences, voxels of the shape volume that are not colour consistent. The voxels that are determined to not be colour consistent may then be removed from the shape volume.

In this implementation, the colour difference is a measure of the colour variance across the plurality of projections and is, in particular, a measure of the variance in the colour hue across the plurality of projections. Measuring the variance in the colour hue provides benefits as compared to measuring RBG or CIELAB variance as it enables the present method to accept less relevant differences in saturation and value that may remain in images, e.g. after colour correction. Such differences may normally be due to differences in the sensor or white balance of the plurality of image capturing devices.

In an example implementation, the present invention uses an estimated three-dimensional skeleton for the at least one object to determine voxels of the shape volume to be removed.

Figure 3:
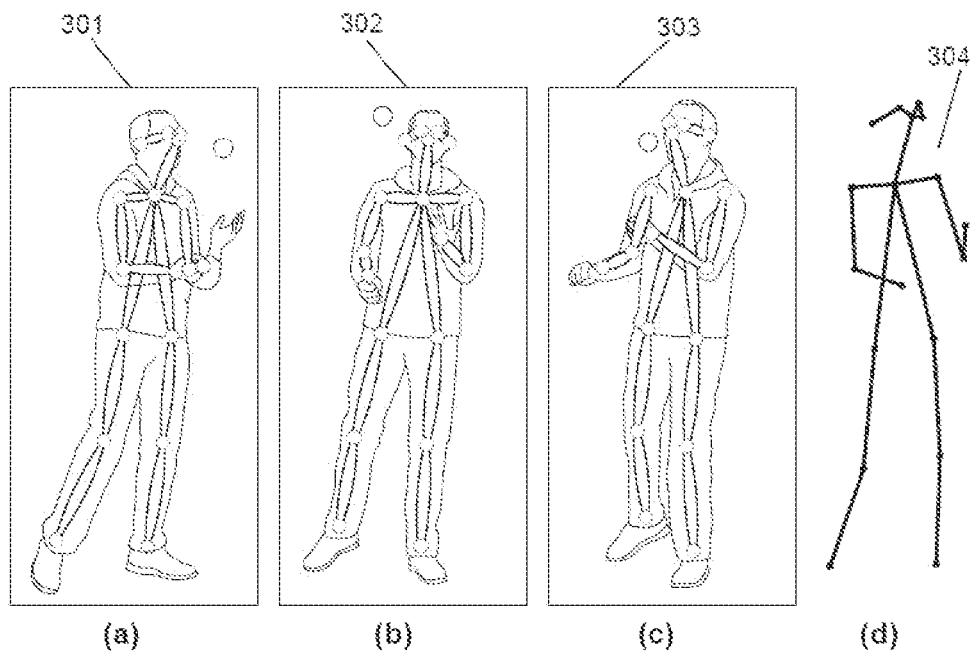
FIG. 3(a)-(d) show example two-dimensional and three-dimensional skeletons generated for an object.

In this example implementation, 2D skeletons of the at least one object are detected in the plurality of images. Example 2D skeletons 301-303 of an object are shown in FIGS. 3(a)-(c). The 2D skeletons 301-303 are used to generate the 3D skeleton 304 as shown in FIG. 3(d).

In more detail, the 3D skeleton 304 of the object is estimated by triangulating a set of 2D skeletons 301-303 detected in the plurality of images. The 2D skeletons 301-303 may be determined using Part Affinity Fields (PAFs). This results in, for each image, a set of detected skeletons 301-303 having a set of 2D joints and a set of confidence values. Unwanted skeletons (e.g. objects in the background, such as people walking by or audience members to the scene) may be filtered out by using the silhouette information, otherwise known as object masks obtained during the object segmentation. If there is more than one intended object in the scene, epipolar constraints may be applied to the scene so that the 2D skeletons 301-303 can be correctly matched to the different objects. The 3D joint coordinates for each skeleton 301-303 are estimated by minimizing a set of overdetermined linear triangulation problems to generate the 3D skeleton 304.

In step 105, for voxels of the shape volume, the distance between the voxel and the portion of the 3D skeleton that is nearest to the voxel is calculated. This can be performed by calculating the Euclidean distance of each voxel to its closest bone in the skeleton. Voxels from the shape volume may then be removed based on the calculated distance. In particular, voxels of the shape volume that are far away from an estimated three-dimensional skeleton of the object may be removed. Such voxels may unlikely be part of the object, and thus may be removed resulting in a shape volume that better reflects the object in the scene.

In an example implementation, both the voxel colour consistency check and the three-dimensional skeleton check are used to carve out the shape volume estimated using the silhouette information. The voxel may be removed based on a score calculated as a result of the voxel colour consistency check score and a score calculated as a result of the three-dimensional skeleton check. That is, if both the voxel colour consistency check score and the three-dimensional skeleton check score are low for a voxel, the voxel is likely to be removed.

The voxel colour consistency check and the three-dimensional skeleton check are performed for the voxels on the surface of the shape volume. As voxels are removed, new voxels are exposed and form part of the surface of the shape volume. The voxel colour consistency check and/or the three-dimensional skeleton check is repeated until a convergence condition is reached, e.g. no more voxels satisfy a condition for removal. In other words, the consistency check need to be performed on all of the voxels, but rather on just the surface voxels until a convergence condition is reached.

Figure 4:
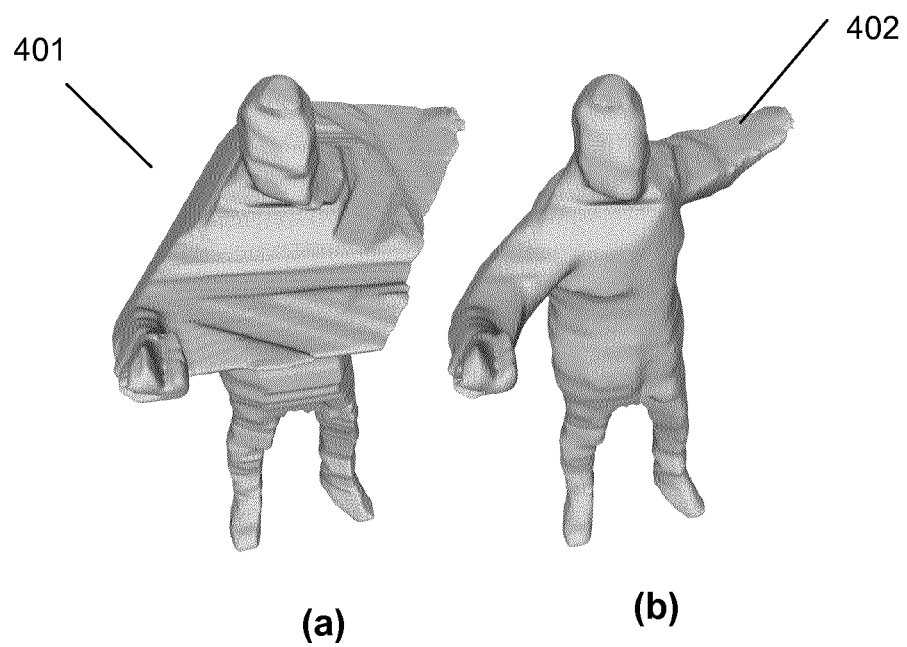
FIGS. 4(a)-(b) show example three-dimensional shape volumes generated for an object.

Referring to FIG. 4(a), there is shown an example shape volume 401 estimated using the silhouette information only. The estimated shape volume 401 is extremely inflated due to severe occlusions as a result of a sparse image capturing device setup.

Referring to FIG. 4(b), there is shown an example shape volume 402 estimated using the silhouette information and then carved out using the colour consistency check and three-dimensional skeleton check operations described above. The colour consistency check is effective in softening the edges of the shape volume, while the 3D skeleton check is effective in removing a large number of incorrect voxels.

Referring again to FIG. 1, in step 106 of the method, the 3D model is generated by combining the object point cloud and the shape volume.

In an example implementation, the surface $M_v$ of the shape volume is estimated using a Marching Cubes algorithm or other similar approach. Further, the surface $M_f$ of the object point cloud is estimated using a Poisson Surface Reconstruction (PSR) algorithm or other similar approach. The surface $M_f$ is then used to guide a controlled deformation of the surface $M_v$, such that the resultant model has both the details captured by the object point cloud and full volume completeness.

In this example implementation, a ray for every vertex $v_i$ of $M_v$ is cast following its normal. If the ray intersects with $M_f$, $v_i$ will move to the point of intersection. The set of vertices displaced after this ray casting stage define a set of handle points H for the deformation problem. The deformation region R grows from the handle region by iteratively searching the neighbours of each $v_i \in H$. Each $v_j \in R$ is assigned a level that increases with the number of steps needed to take to approach a vertex of the handle. The closest handle vertex and its corresponding displacement vector $d_i^h$ are also stored. The displacement function for each $v_i^r$ is defined as follows:

$$d(v_j^r) = v_j^r + n_j^r \cdot d_i^h \left( \frac{l - l_j}{l} \right) \quad (2)$$

Here, $n_j^r$ is the normal of vertex $v_j^r$, l is the total number of levels in the deformation region, and $l_j$ is the current level.

In this example implementation, possible artifacts in the 3D model are reduced by applying Laplacian smoothing to the resulting 3D model, and by identifying and removing isolated triangle isles and non-manifold edges and vertices.

The above example implementation is only one example approach for combining the object point cloud and the shape volume. Other methods for combining the object point cloud and the shape volume to generate the 3D model are within the scope of the present invention.

By combining the object point cloud and the shape volume, the present invention is able generate three-dimensional models that accurately reflect the object in the scene even in sparse image capturing device setups. The present invention therefore enables the benefits of the object point cloud and the silhouette information techniques to be achieved without the associated disadvantages. The generated three-dimensional model is able to preserve the detail of the object point cloud and the completeness of the estimated three-dimensional shape volume while avoiding inflation of the three-dimensional model.

Figure 5:
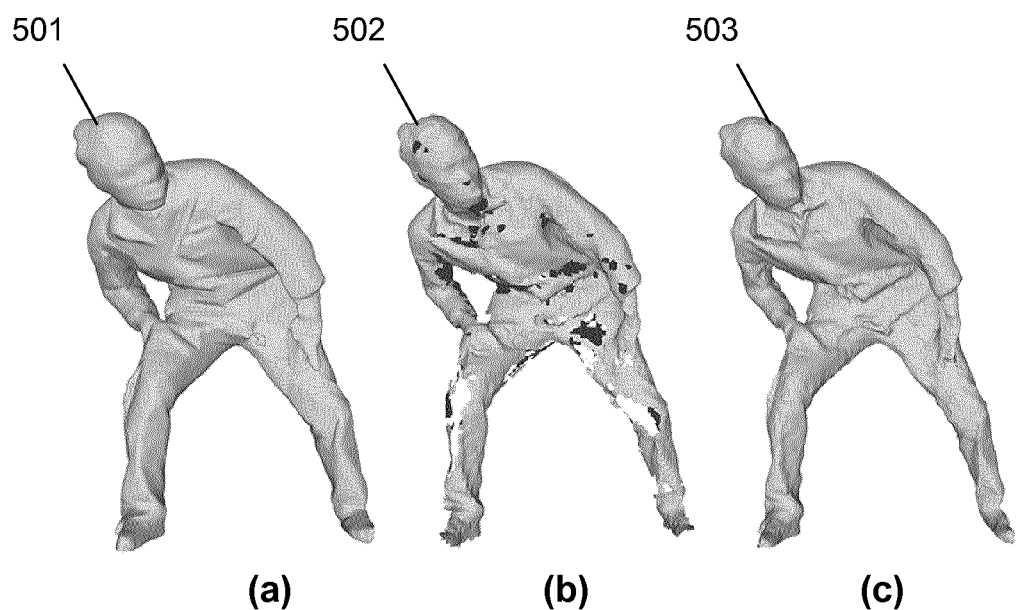
FIGS. 5(a)-5(c) show example three-dimensional shape volumes generated for an object using a first example setup of image capturing devices.
Figure 6:
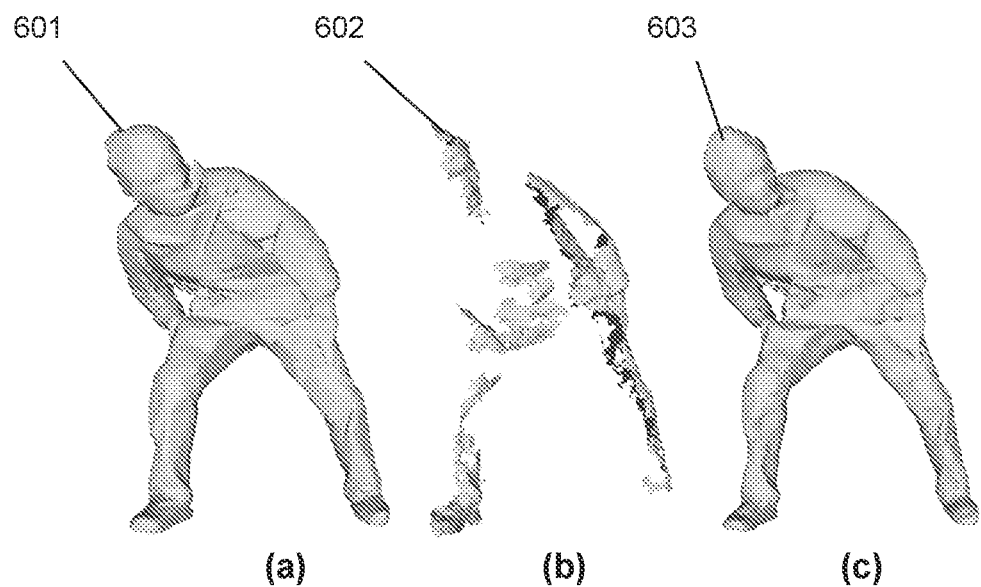
FIGS. 6(a)-6(c) show example three-dimensional shape volumes generated for an object using a second example setup of image capturing devices.
Figure 7:
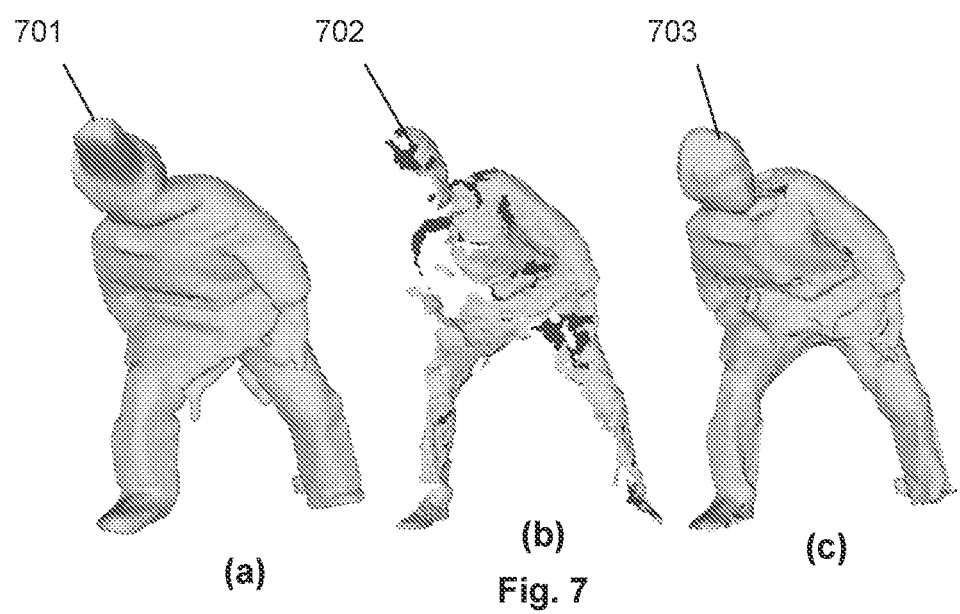
FIGS. 7(a)-7(c) show example three-dimensional shape volumes generated for an object using a third example setup of image capturing devices.

Referring to FIGS. 5 to 7 there are shown 3D models generated based on image data of a scene captured by a plurality of image capturing devices.

Referring to FIGS. 5(a)-(c) there are shown three 3D models 501, 502, 503 of an object captured using 53 image capturing devices. This is a dense camera setup meaning that there is good scene coverage and a significant amount of overlap between the images captured by the plurality of image capturing devices. FIG. 5(a) there is shown a 3D model 501 of an object generated using an existing SfS approach, FIG. 5(b) shows a 3D model 502 of an object generated using an existing point cloud MVS approach, and FIG. 5(c) shows a 3D model 503 of an object generated using the approach of the present invention where the shape volume and the object point cloud are combined to generate the 3D model 503.

In this dense camera setup, both the SfS approach and the MVS approach work well, but the approach of the present invention results in a more accurate 3D model by combining these existing approaches.

Referring to FIGS. 6(a)-6(c) there are shown three 3D models 601, 602, 603 of an object captured using 18 image capturing devices. The 18 image capturing devices have been arranged in way which attempts to preserve as much scene coverage as possible, and as result the overlap between the images captured by the plurality of image capturing devices suffers. FIG. 6(a) shows a 3D model 601 of the object generated using the SfS approach, FIG. 6(b) shows the 3D model 602 of the object generated using the point cloud MVS approach, and FIG. 6(c) shows the 3D model 603 of the object generated using the approach of the present invention where the shape volume and the object point cloud are combined to generate the 3D model 603.

As the image overlap of this sparse camera setup has been reduced with the intention of maximising the scene coverage, it can be seen that the SfS approach outperforms the MVS approach, as expected. Significantly, however, the approach of the claimed invention which combines the shape volume and the object point cloud outperforms both these approaches. In particular, the 3D model 603 more accurately reflects the object captured in the scene.

Referring to FIGS. 7(a)-7(c) there are shown three 3D models 701, 702, 703 of an object captured using 18 image capturing devices. In this example, the image capturing devices have been arranged in a way which prioritises overlap of the image capturing devices rather than scene coverage. FIG. 7(a) shows a 3D model 701 of the object generated using the SfS approach, FIG. 7(b) shows the 3D model 702 of the object generated using the point cloud MVS approach, and FIG. 7(c) shows the 7D model 603 of the object generated using the approach of the present invention where the shape volume and the object point cloud are combined to generate the 3D model 703.

As the image overlap of this sparse camera setup has been maximised at the expense of scene coverage, it can be seen that the MVS approach outperforms the SfS approach, as expected. Significantly, however, the approach of the claimed invention which combines the shape volume and the object point cloud outperforms both these approaches. In particular, the 3D model 703 more accurately reflects the object captured in the scene.

Accurate 3D reconstruction of objects in the scene, and in particular dynamic objects, allows users to fully immerse in related VR/AR/MR visualizations. The method according to the first aspect of the invention is able to achieve this while supporting affordable image capture and processing. Therefore, it can be seen that the approach of the present invention has benefits in terms of 3D model accuracy in both dense camera setups and sparse camera setups. Significantly, the present invention provides these benefits in sparse camera setups regardless of whether image capturing device overlap or scene coverage is maximised.

In an example implementation, the method further comprises generating appearance information for the 3D model. This involves using image-based rendering methods to texture the three-dimensional model using the plurality of images, and in particular involves colouring the 3D model using an image blending technique. This technique acts to merge the colour information provided by the different image capturing devices, even though there might be over or underexposed images and differences in colour balance. The background 3D model may be rendered as a textured 3D mesh.

In this example implementation, the blending function is firstly defined in the topology space by back-projecting every facet to each image to obtain a per-facet per-image rating. In this way, the higher the area of the back-projection of the facet onto the image, the higher the rating. The final rating is smoothed using the angle between the normal of the facet and the image, which penalizes wider angles even when the image capturing device is very close to the 3D model. In addition, an occlusion test for every facet and image is performed which avoids the inclusion of wrongly projected areas onto the textured 3D model. Moreover, to further improve the visual quality of the textured 3D models, particularly of human faces, the method in this example implementation searches for faces in the images and determine the image capturing device with the largest facial region. The rating of the facets belonging to that detected area are significantly increased, giving a much larger contribution to that particular image capturing device. Further, to ensure smooth transitions across the 3D model, each vertex also gets a per-image rating by averaging the ratings of the faces that contain it. The final colour for each point of the 3D model is a weighted average of the camera contributions, bilinearly interpolating the ratings across the 3D model.

The generated appearance information may then be used to generate visual information for the scene. There are several methods for generating the visual information for display on different devices.

The 3D model of the object is rendered either as a point cloud, or as a textured 3D mesh. These approaches for rendering the 3D model of the object may be used for both view synthesis and for visualization in VR/AR/MR.

In free view point video, video may be viewed from new angles either in a free navigation mode and a view synthesis mode. During the free navigation mode, a user can freely change the viewpoint and only the reconstructed objects are rendered. In the view synthesis mode, the path is restricted to a circular trajectory between image capturing devices.

In example implementations, the 3D model of the scene and the 3D model of the background are used to improve view synthesis, such that the user may sweep between different camera views smoothly.

In the view synthesis mode, the virtual camera is using extrinsic and intrinsic parameters from the selected real image capturing device, and the captured image is projected onto the 3D model and a background plane. During the transition phase, when a user changes the viewpoint, the new parameters of the virtual camera are computed as an interpolation between the current camera and the destination camera. In the case of different image resolutions or focal lengths for the current camera and the destination camera, linear interpolation may be used to compute virtual camera intrinsic parameters. To compute the virtual camera's position and rotation, a spherical linear interpolation approach may be used When a change in the viewpoint is requested by the user, a virtual camera begins to move from the current viewpoint of the camera towards the destination camera. During the transition, the pose of the virtual camera is unknown and is determined according to the known poses of the current and destination cameras respectively.

To synthesize a virtual view in real-time, the method only considers the current frame and the two nearest image capturing devices. The scene from the two nearest image capturing devices is rendered into depth textures in two passes. In the third pass, the scene from the virtual camera is rendered, a per-pixel depth test in a fragment shader is performed, and colours from the two cameras and the rendered mesh (or point cloud) are blended. In the last rendering pass post-processing effects such as motion blur may also be applied.

Figure 8A:
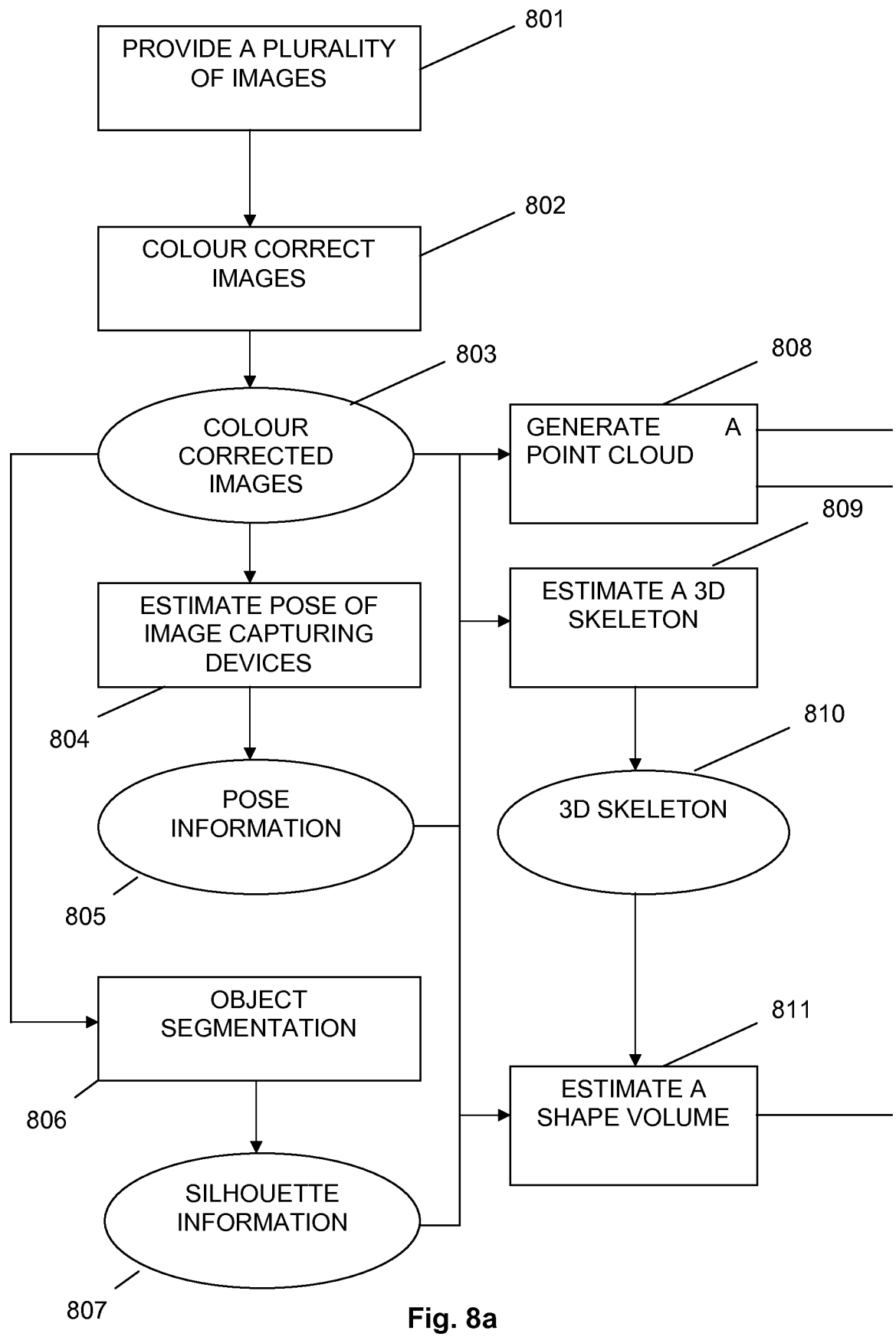
FIGS. 8(a)-8(b) show a detailed example implementation of the method according to the first aspect of the invention.
Figure 8B:
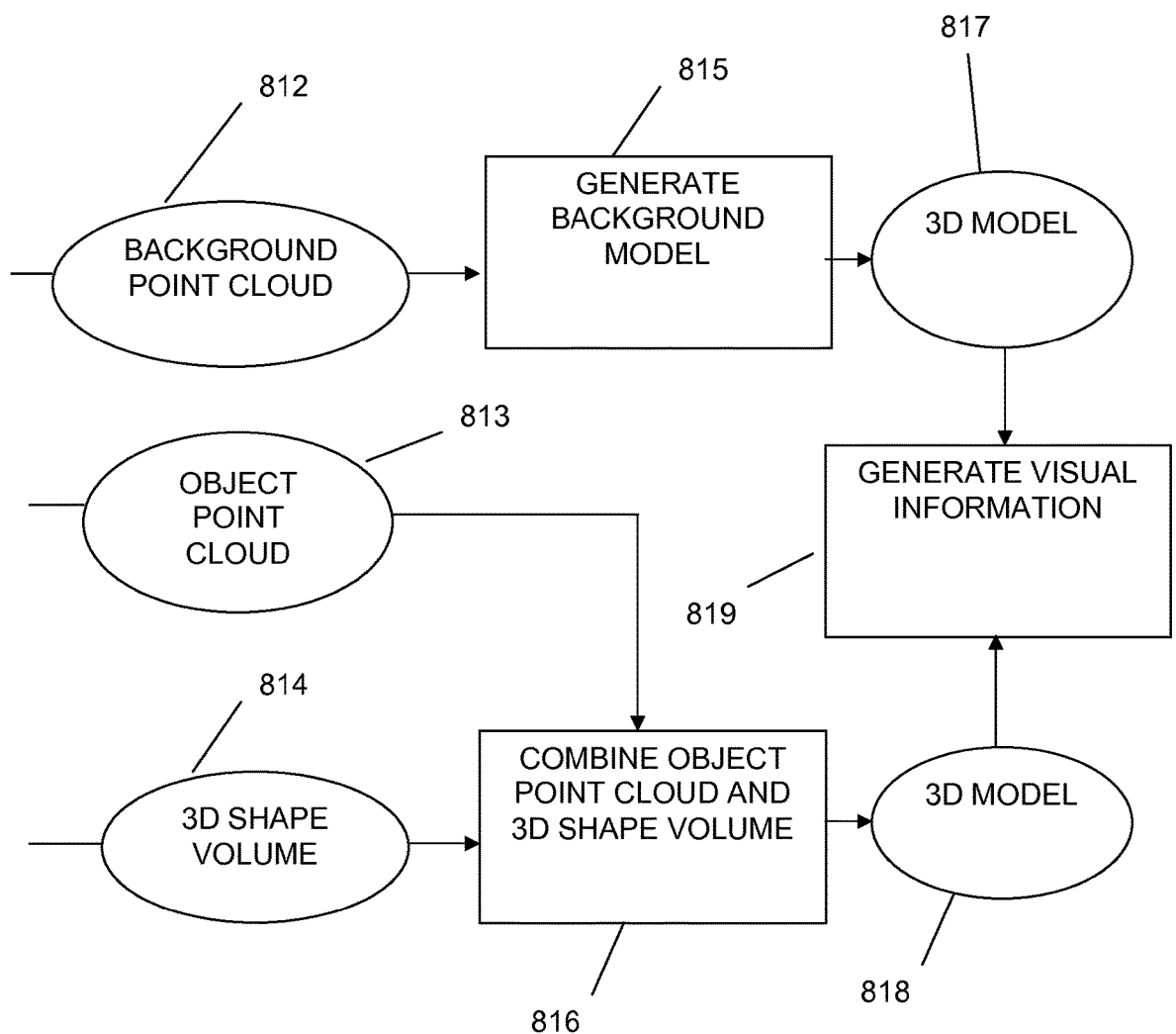

Referring to FIGS. 8(a)-8(b), there is shown a detailed implementation of the method according to the first aspect of the invention.

In step 801, the plurality of images are provided.

In step 802, the images are colour corrected using the techniques described above so as to provide colour corrected images 803.

In step 804, the poses of the image capturing devices that provided the plurality of images are estimated using the colour corrected images 803 and the techniques described above. This results in pose information 805.

In step 806, object segmentation is performed on the colour corrected images 803 to segment the object from the background in the plurality of images. This results in silhouette information, otherwise known as object masks 807.

In step 808, the colour corrected images 803, pose information 805, and silhouette information 807 are used to generate a point cloud using the techniques described above. This results in a background point cloud 812 and an object point cloud 813.

In step 809, the colour corrected images 803, pose information 805, and silhouette information 807 are used to estimate a 3D skeleton using the techniques described above. This results in a 3D skeleton 810.

In step 811, the colour corrected images 803, pose information 805, silhouette information 807 and 3D skeleton 810 are used to estimate a 3D shape volume for the object using the technique described above. This results in a 3D shape volume 814.

In step 815, the background point cloud 812 is used to generate a background model 815. This results in a 3D model 817 for the background.

In step 816, the object point cloud 813 and the 3D shape volume 814 are combined using the techniques described above. This results in a 3D model 818 for the object.

In step 819, the 3D model 817 for the background and the 3D model 818 for the object are used to generate visual information, such as by using rendering techniques.

Although the above described embodiments use the object point cloud and shape volume, and combine these to generate the 3D model, this approach is not necessary in all aspects of the invention.

In particular, the additional step of performing the three-dimensional skeleton check to remove voxels from the shape volume improves, by itself, on SfS approaches by providing improved shape carving of the shape volume. This means that a shape volume estimated using the 3D skeleton check described above improves on the SfS approach and results in the more accurate generation of the three-dimensional model even in sparse camera setups.

In particular, the additional step of performing the colour consistency check using the colour hue information to remove voxels from the shape volume improves, by itself, on SfS approaches by providing improved shape carving of the shape volume. This means that a shape volume estimated using voxel colour consistency check described above improves on the SfS approach and results in the more accurate generation of the three-dimensional model even in sparse camera setups.

The colour consistency check and the three-dimensional skeleton check may be performed together without necessarily required the combining with the object point cloud as described in the above embodiments.

The present invention further provides an apparatus and a computer readable medium for implementing the methods described above. The apparatus may be a computing apparatus or a collection of computing apparatuses communicated with one another over a distributed network.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements.

Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

In summary, there is provided a method and apparatus for generating a three-dimensional model. The method comprising providing a plurality of images of a scene captured by a plurality of image capturing devices (101); providing silhouette information of at least one object in the scene (102); generating a point cloud for the scene in 3D space using the plurality of images (103); extracting an object point cloud from the generated point cloud, the object point cloud being a point cloud associated with the at least one object in the scene (104); estimating a 3D shape volume of the at least one object from the silhouette information (105); and combining the object point cloud and the shape volume of the at least one object to generate a three-dimensional model (106).

An apparatus for generating a 3D model, and a computer readable medium for generating the 3D model are also provided.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for generating a three-dimensional model, the method comprising the following steps:
   (a) providing a plurality of images of a scene captured by a plurality of image capturing devices;
   (b) providing silhouette information of at least one object in the scene, the silhouette information being extracted from the plurality of images;
   (c) generating a point cloud for the scene in three-dimensional space using the plurality of images;
   (d) extracting an object point cloud from the generated point cloud, the object point cloud being a point cloud associated with the at least one object in the scene;
   (e) estimating a three-dimensional shape volume of the at least one object from the silhouette information; and
   (f) combining the object point cloud and the shape volume of the at least one object to generate the three-dimensional model.

2. A method as claimed in claim 1, wherein step (e) of estimating the three-dimensional shape volume further comprises:
   performing a voxel colour consistency check on the shape volume estimated from the silhouette information so as to determine one or more voxels of the shape volume that are not colour consistent; and
   removing one or more voxels from the shape volume that are determined not to be colour consistent.

3. A method as claimed in claim 2, wherein performing the voxel colour consistency check on the shape volume comprises:
   projecting voxels of the shape volume estimated from the silhouette information onto the plurality of images to generate a plurality of projections for each voxel projected onto the plurality of images;
   calculating the colour variance across the plurality of projections for each voxel projected onto the plurality of images; and
   determining, from the calculated colour variances, one or more voxels of the shape volume that are not colour consistent.

4. A method as claimed in claim 3, wherein the calculated colour variance is the variance in the colour hue across the plurality of projections for each voxel projected onto the plurality of images.

5. A method as claimed in claim 1, wherein step (e) of estimating the three-dimensional shape volume further comprises:
   providing an estimated three-dimensional skeleton of the at least one object, the three-dimensional skeleton being estimated from the plurality of images;
   calculating, for voxels of the shape volume, the distance between the voxel and a portion of the three-dimensional skeleton; and
   removing one or more voxels from the shape volume based on the calculated distance.

6. A method as claimed in claim 5, wherein providing the three-dimensional skeleton of the at least one object comprises: detecting two-dimensional skeletons of the at least one object in the plurality of images; and generating the three-dimensional skeleton from the detected two-dimensional skeletons.

7. A method as claimed in claim 1, wherein step (f) of combining the object point cloud and the shape volume of the at least one object to generate the 3D model comprises:
   estimating the surface of the shape volume;
   estimating the surface of the object point cloud; and
   using the surface of the shape volume and the surface of the object point cloud to generate the 3D model.

8. A method as claimed in claim 1, wherein step (a) of providing the plurality of images further comprises correcting the colour of the plurality of images by applying a colour transformation function to the plurality of images, and/or wherein step (a) of providing the plurality of images further comprises estimating the pose of the plurality of image capturing devices in three-dimensional space when capturing the plurality of images.

9. A method as claimed in claim 1, wherein step (b) of providing the silhouette information of the at least one object in the scene comprises segmenting the plurality of images so as to determine the silhouette information.

10. A method as claimed in claim 1, further comprising:
    (g) generating appearance information for the three-dimensional model; and
    (h) generating visual information for the scene using the appearance information.

11. A method as claimed in claim 10, wherein step (g) of generating the appearance information comprises using image-based rendering methods to texture the three-dimensional model using the plurality of images.

12. A method as claimed in claim 10, further comprising:
    extracting a background point cloud from the generated point cloud, the background point cloud being the point cloud remaining after the object point cloud has been extracted;
    generating a background three-dimensional model from the background point cloud.

13. An apparatus for generating a three-dimensional model, the apparatus comprising:
    an image providing module for providing a plurality of images of a scene captured by a plurality of image capturing devices;
    a silhouette information providing module for providing silhouette information of at least one object in the scene, the silhouette information being extracted from the plurality of images;
    a point cloud generation module for generating a point cloud for the scene in three-dimensional space using the plurality of images;
    a object point cloud extraction module for extracting a object point cloud from the generated point cloud, the object point cloud being a point cloud associated with the at least one object in the scene;
    a three-dimensional shape volume estimation module for estimating a three-dimensional shape volume of the at least one object from the silhouette information; and
    a combining module for combining the object point cloud and the shape volume of the at least one object to generate the three-dimensional model.

14. A method for generating a three-dimensional model, the method comprising:
    (a) providing silhouette information of at least one object in the scene, the silhouette information being extracted from a plurality of images captured by a plurality of imaging devices;
    (b) providing a three-dimensional skeleton of the at least one object;
    (c) estimating a three-dimensional shape volume of the at least one object from the silhouette information;

(d) calculating, for voxels of the shape volume, the distance between the voxel and a portion of the three-dimensional skeleton;
(e) removing one or more voxels from the shape volume based on the calculated distance to generate a modified shape volume; and
(f) generating the three-dimensional model using the modified shape volume.

15. A method for generating a three-dimensional model, the method comprising:
(a) providing silhouette information of at least one object in the scene, the silhouette information being extracted from a plurality of images captured by a plurality of imaging devices;
(b) estimating a three-dimensional shape volume of the at least one object from the silhouette information;
(c) performing a voxel colour consistency check on the shape volume estimated from the silhouette information, the voxel colour consistency check comprising:
projecting voxels of the shape volume onto the plurality of images to generate a plurality of projections for each voxel projected onto the plurality of images;
calculating the colour variance across the plurality of projections for each voxel projected onto the plurality of images, wherein the calculated colour variance is the variance in the colour hue across the plurality of projections for each voxel projected onto the plurality of images;
determining, from the calculated colour variances, one or more voxels of the shape volume that are not colour consistent; and
(d) removing one or more voxels from the shape volume that are determined not to be colour consistent so as to generate a modified three-dimensional shape volume; and
(e) generating the three-dimensional model using the modified three-dimensional shape volume.

* * * * *